United States Patent [19]

Gregerson et al.

[11] Patent Number: 4,865,190

[45] Date of Patent: Sep. 12, 1989

[54] SECURITY PACKAGE WITH ROTATABLE LOCKING CHANNEL

[75] Inventors: Barry Gregerson, Shorewood; Larry Dressen, Waconia, both of Minn.

[73] Assignee: Empak, Inc., Chanhassen, Minn.

[21] Appl. No.: 263,404

[22] Filed: Oct. 27, 1988

[51] Int. Cl.⁴ ..................... B65D 85/57; B65D 85/672
[52] U.S. Cl. ..................................... 206/309; 206/1.5; 206/387; 206/807
[58] Field of Search ............... 206/307, 309, 312, 387, 206/444, 1.5, 807

[56] References Cited

U.S. PATENT DOCUMENTS

| | | | |
|---|---|---|---|
| 4,381,836 | 5/1983 | Rivkin et al. | 206/807 |
| 4,466,540 | 8/1984 | Lotrous et al. | 206/1.5 |
| 4,558,782 | 12/1985 | Iverson | 206/387 |
| 4,718,547 | 1/1988 | MacTavish | 206/1.5 |
| 4,759,442 | 7/1988 | Gregerson et al. | 206/1.5 |
| 4,805,769 | 2/1989 | Soltis et al. | 206/1.5 |

Primary Examiner—Jimmy G. Foster
Attorney, Agent, or Firm—Hugh D. Jaeger

[57] ABSTRACT

A security package for prevention of shoplifting including an elongated handle structure secured to a rectangular encompassing structure for holding an article such as an audio cassette box, video cassette box or a compact disk "jewel box". A rotating locking channel with latches for positive locking which engages catch ports in a stationary channel member adjacent to the rectangular encompassing structure to receive an article such as an audio, video or compact disk box. The rotating locking channel is rotated, and the article box in a rectangular encompassing structure area is captured by the rotating of the rotating locking channel with one-way beveled latches to secure the article box within the rectangular encompassing structure. A plurality of one-way locking latch and catch mechanisms are used to accomplish a package lock.

13 Claims, 11 Drawing Sheets

VIEW A-A

VIEW C-C

SECURITY PACKAGE WITH ROTATABLE LOCKING CHANNEL

BACKGROUND OF THE INVENTION

1. Field of the Invention

The present invention pertains to a security package, and more particularly, pertains to a structure with a handle, a rectangular encompassing structure, and a locking assembly which encompasses an audio cassette, a video cassette box or a compact disk jewel box. This security package provides for easy package securement and for protection against shoplifting and pilfering.

2. Background of the Invention

There has been a need to secure the small and relatively expensive audio-visual articles such as audio cassette boxes, video cassette boxes, and now the very popular compact disk "jewel box" in security packages to inhibit shoplifting. These audio-visual products are packaged in plastic storage cases of such size as to easily lend themselves to theft through shoplifting. Due to the high price of audio and video cassettes and compact disks, the losses become expensive to the vendors and are significant even if only a few cassettes or disks are stolen per month.

The prior art solutions to the problem have not been entirely acceptable. Keeping the material away from customers, behind the counters and off the shelves is a door marketing technique, is not cost effective, let alone labor effective, and does not solve the problem of theft by employees of a vendor. Another problem is that some prior art packages, such as those made of a plastic film material, are easily opened so that anyone with a pocket knife can easily slit the package apart and steal the contents.

Prior art security package devices also required that stock personnel often were required to use an article such as a hammer or other striking object, or other expensive one-of-a-kind devices to close and secure a locking channel or tab over the contained merchandise, causing additional expense, back-room time and effort to be expended to actually get the product placed on the shelf.

The present invention provides a security package which is light-weight, secure and may be opened with devices such as cutting pliers, heavy knives or the like. The present invention also provides a security package into which the merchandise can be secured into the security package at "shelf-side" as the need arises with a modest amount of digital pressure applied to the security package locking mechanism without the need for other locking assist devices such as hammers, pliers, presses, or the like.

SUMMARY OF THE INVENTION

The general purpose of the present invention is a security package for holding an article such as cassette or compact disk box, and for securement of the article inside the package for prevention of shoplifting or other form of theft.

According to one embodiment of the present invention, there is provided a security package with a handle structure, a rectangular encompassing structure, and a swinging or rotating locking channel which retains a plastic box, such as that for an audio cassette box, a VCR cassette box, or compact disk box, within retainer bars and members of the encompassing structure, while still providing for viewing of the printed message.

The rotating locking channel mounts on a configured stationery channel with a living hinge therebetween, and rotates to engage one-way beveled latches on the rotating locking channel with latches in a stationary channel to secure a box within the confines of the rectangular encompassing structure. A plurality of latches and catches virtually eliminate the possibility of disengagement from each other without a special tool.

According to another embodiment of the present invention, there is provided a side wall handle rim portion containing a handle, planar members intersecting the encompassing side wall, lateral members between the opposing side wall members, a box like channel member on the interior sides of the two opposing side wall members, a rotating locking channel located adjacent to the box like channel members which swings on a living hinge on the channel, lower planar retainer member across the bottom of the encompassing side wall, a retainer bar across an upper end of the encompassing side wall and a rectangular encompassing structure for containment of a video, audio, or disk box and contents.

One significant aspect and feature of the present invention is a security package with a rotating locking channel used to secure a rectangular object within a rectangular encompassing member.

Another significant aspect and feature of the present invention is the use of beveled one-way latches on a rotating locking channel which positions into catches to secure the rotating locking channel in a fixed position.

A further significant aspect and feature of the present invention is the rotation of a rotatable locking channel about a living hinge.

Still another significant aspect and feature of the present invention is a sturdy, secure security package for audio or visual boxes which is not easily pocketable nor accommodating to a purse or bag without being obvious to an ordinary onlooker. The security package is a prevention against shoplifting.

Still another significant aspect and feature of the present invention is a security package with an rectangular encompassing structure which securely encloses a plastic box such as a cassette or disk box for protection against theft. An audio or disk box in the security package cannot be removed from the premises or a store without being obvious to someone during the removal.

A still further significant aspect and feature of the present invention is a security package which is suitable for placement on store shelves or sales racks, and is aesthetically pleasing for presentation of the goods.

Yet another significant aspect and feature of the present invention is a security package which easily and readily locks without any required external devices to secure merchandise within.

There is provided a plurality of one-way positive lock latch and catch mechanisms.

Having thus described the embodiments of the present invention, it is the principal object hereof to provide a security package with a rotating locking channel about a living hinge with one-way beveled latches and a channel member with one-way catches for the containment of video, audio or disk boxes therein in the security package.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DESCRIPTION OF THE PREFERRED EMBODIMENTS

Figure 1:
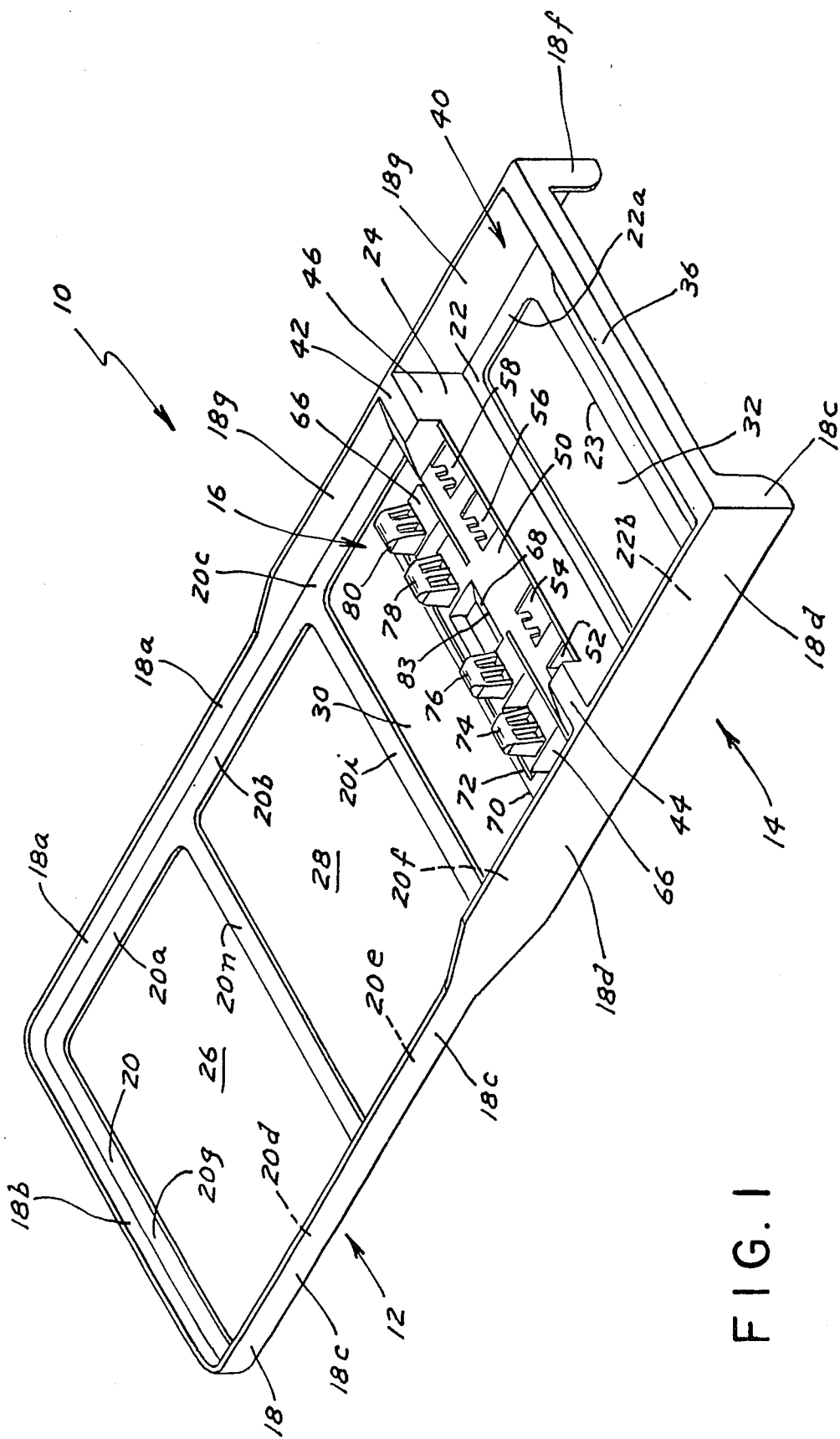
FIG. 1 illustrates a perspective view of a security package with a rotating locking channel.

FIG. 1 illustrates a perspective view of a positive lock security package 10 also known as the security package including an elongated handle structure 12, a rectangular encompassing structure 14, and a rotating locking channel 16 for retention of a cassette like box. The positive lock security package 10 is formed from and between a vertically oriented side wall handle rim 18 encompassing and surrounding other elements of the positive lock security package 10 which includes side wall handle rim portions 18a, 18b and 18c, side wall 18d, partial end side walls 18e and 18f, and side wall 18g. The side wall handle rim portions 18a-18c are shorter than the other portions of the side wall handle rim 18 by way of example and for purposes of illustration only and are not to be construed as limiting of the present invention.

The horizontally oriented flat perimeter member 20 includes longitudinal web portions 20a, 20b and 20c intersecting side wall 18a and 18g, as illustrated, and the longitudinal web portions 20d, 20e and 20f intersect side wall handle rim portion 18c and 18d as illustrated.

The horizontally oriented flat perimeter member 20 also includes internal lateral web portions 20g and 20h between end side walls 18a and 18c, and lateral web portions 20i between side walls 18d and 18g.

The rectangular encompassing structure 14 includes a horizontally oriented flat perimeter member 22 in the lower surface which includes horizontally oriented longitudinal perimeter members 22a and 22b and a lateral inner perimeter member 22c which intersects a stationary channel 24 as later described in detail. A planar retainer member 23 extends between the longitudinal inner perimeter portions 22a and 22b and between the lower portions of the side walls 18d and 18g.

Openings 26 and 28 in the elongated handle structure 12 are bounded by the longitudinal web portions 20a, 20d, 20b, internal lateral web portion 20h, and flat perimeter members 20b and 20c and web portions 20h and 20i, respectively. Opening 30 is bounded by longitudinal web portions 20c and 20f, internal lateral web portion 20i and one side of the stationery channel 24. Opening 32 is bounded by 15 longitudinal web portions 22a-22c and planar retainer member 23. Elongated handle structure 12 includes all members adjacent to the intersection of the side wall handle rim 18 and the horizontal oriented flat perimeter member 20, and the elements of the horizontal oriented flat perimeter member 20 intersect the center lines of the elements of the side wall handle rim 18.

Figure 2:
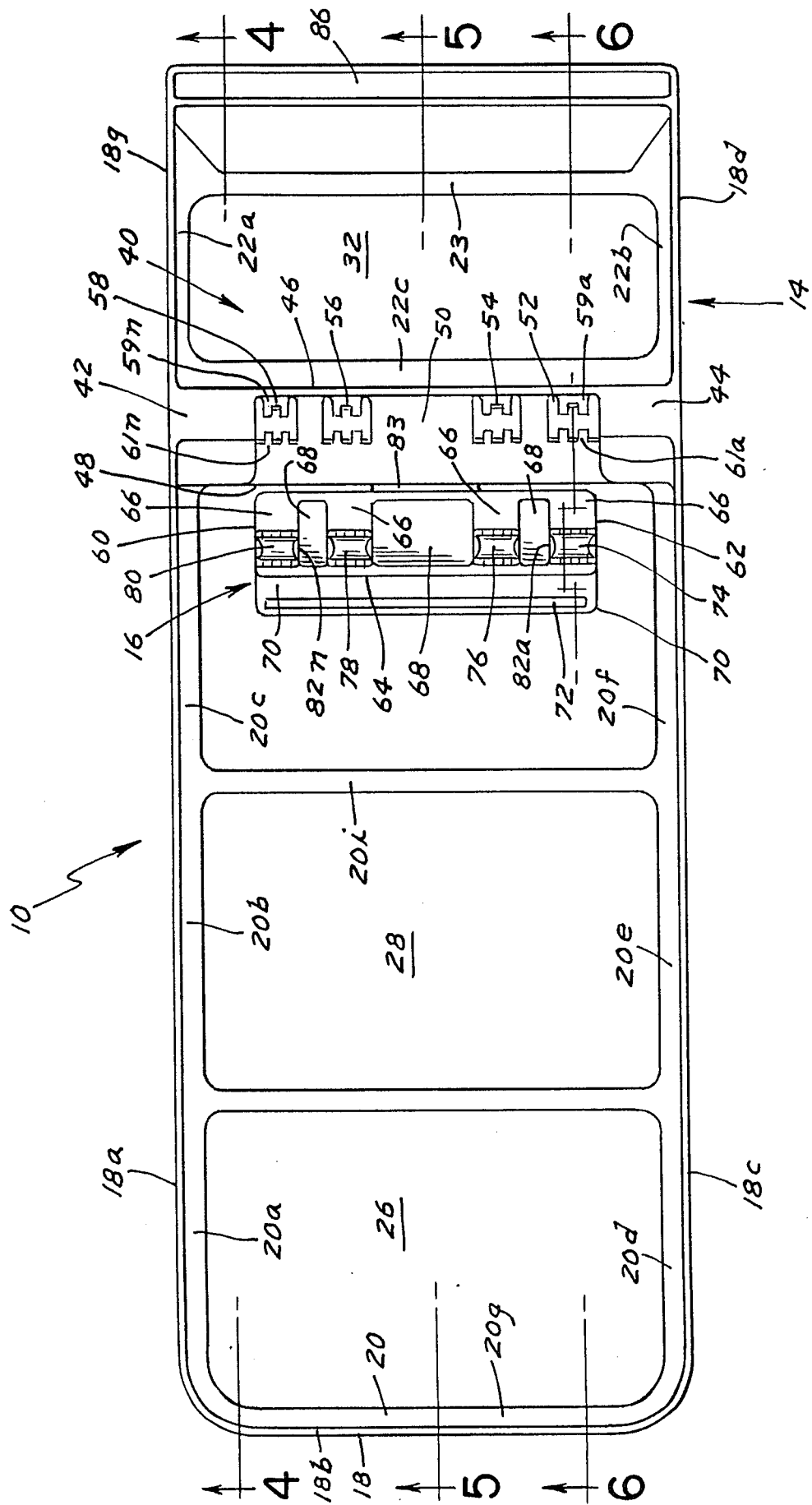
FIG. 2 illustrates a top view of the rotating locking channel.
Figure 3:
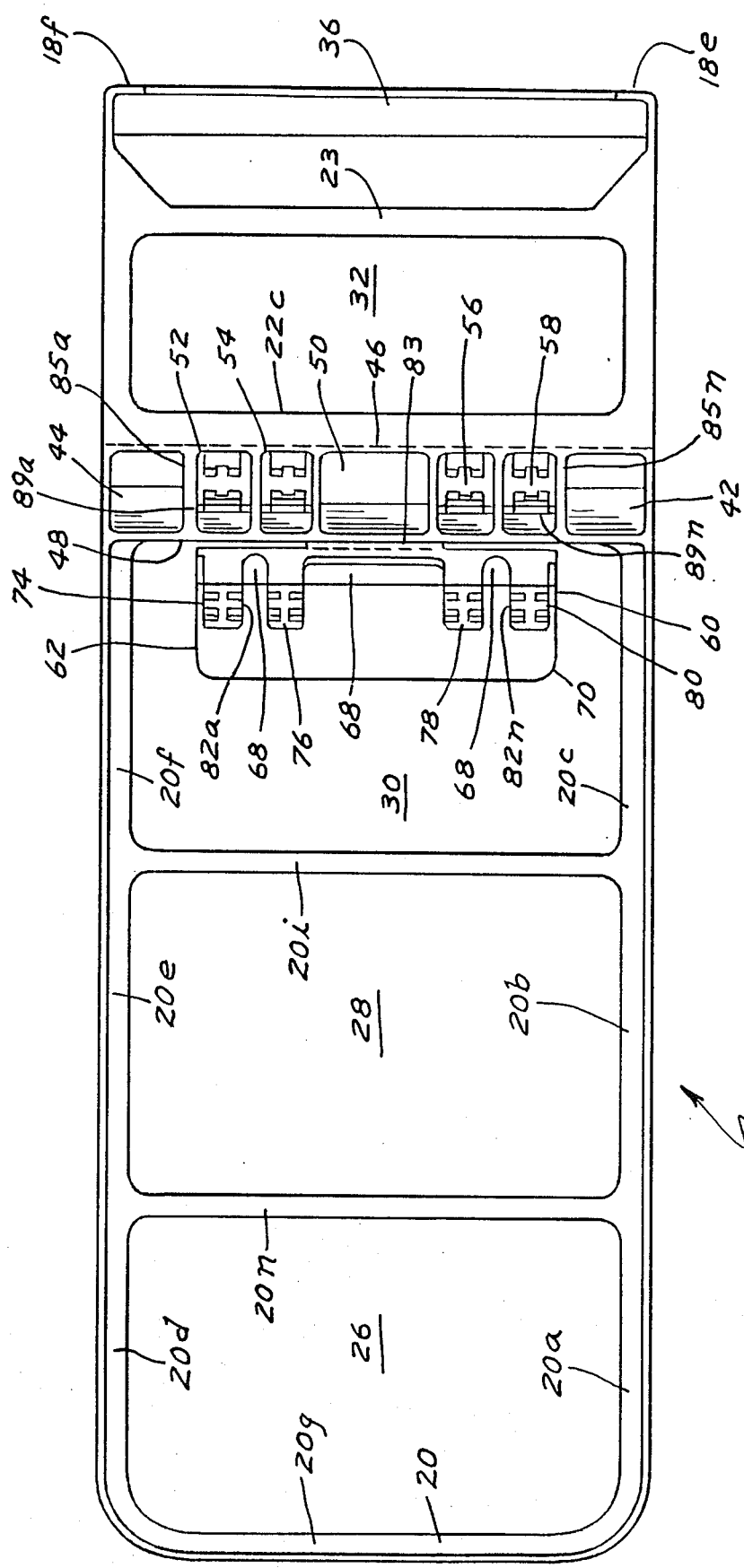
FIG. 3 illustrates a bottom view of the security package.

An upper retainer bar 36 locates between the side wall handle rim portions 18d and 18g adjacent to partial end side walls 18e and 18f. The lower planar retainer member 23, and longitudinal perimeter members 22a and 22b position between and along the lower edge of the side wall handle rim portions 18d and 18g. The lateral internal perimeter member 22c intersects with the stationary channel 24. An orifice 40, for passage of a cassette like box into the rectangular encompassing structure 14, is bounded to the upper edges of side wall handle rim portions 18d and 18g, one side of the stationery channel 24, and the upper retainer bar 36. Beveled box like channel members 42 and 44 are located on the inner walls of side wall handle rim portions 18g and 18d, respectively, and are open on the bottom side as illustrated in FIG. 3. A vertical channel wall member 46 extends vertically and laterally between side wall handle rim portions 18g and 18d, and forms, in part, one wall of the beveled box like channel members 42 and 44. Another shorter channel wall member 48, as illustrated in FIG. 2, is positioned between the side wall handle rim portions 18d and 18g and forms one of the walls of the beveled box like channel members 42 and 44 and helps form a surface of stationery channel 24. A planar surface 50 extends between the beveled box like channel members 42 and 44 and includes a plurality of catch ports 52, 54, 56 and 58.

FIG. 2 illustrates a top view of the positive lock security package 10. The rotating locking channel 16 includes short vertical wall members 60 and 62 and another longer vertical wall 64 extending between the shorter vertical wall members 60 and 62. A horizontally aligned segmented upper planar surface 66 extends between the upper ends of the vertical wall members 60 and 62. A planar beveled member 68 extends between the short vertical wall members 60 and 62. A lower horizontally aligned planar member 70 extends along and across the bottom edges of the shorter vertical walls 60 and 62, the bottom edge of the planar beveled member 68 and the bottom edge of the long vertical wall 64 and extends towards the center of the positive lock security package 10. A ridge 72 extends along the edge of the lower horizontally aligned planar member 70. A plurality of latches including latches 74, 76, 78 and 80 extend upwardly from the segmented upper planar surface 66 of the rotating locking channel 16, and a plurality of support walls including walls 82a-82n extend downwardly from the segmented upper planar surface 66 to intersect the lower horizontally aligned planar member 70 and the planar beveled member 68. A living hinge 83 extends between the stationary channel 24 and the rotating locking channel 16. Cross sections of the rotating locking channel 16 are provided in FIG. 6. Each of the catch ports 52-58 contain pluralities of one-way locking teeth 59a-59n and 61a-61n which interlock with cavities in the latch members 74-80 as later described in detail.

FIG. 3 illustrates a bottom view of the security package 10 where all numerals correspond to those elements previously described. Illustrated in particular is the under side of the stationary channel 24 and the rotating locking channel 16 including views of the catch ports 52-58 and latches 74-80. Also illustrated is a plurality of strut members 85a-85n extending between the vertical channel wall member 46 and the shorter channel wall member 48. Another plurality of shorter strut members 89a-89n extend perpendicular to and between the plurality of strut members 85a-85n.

Figure 4:
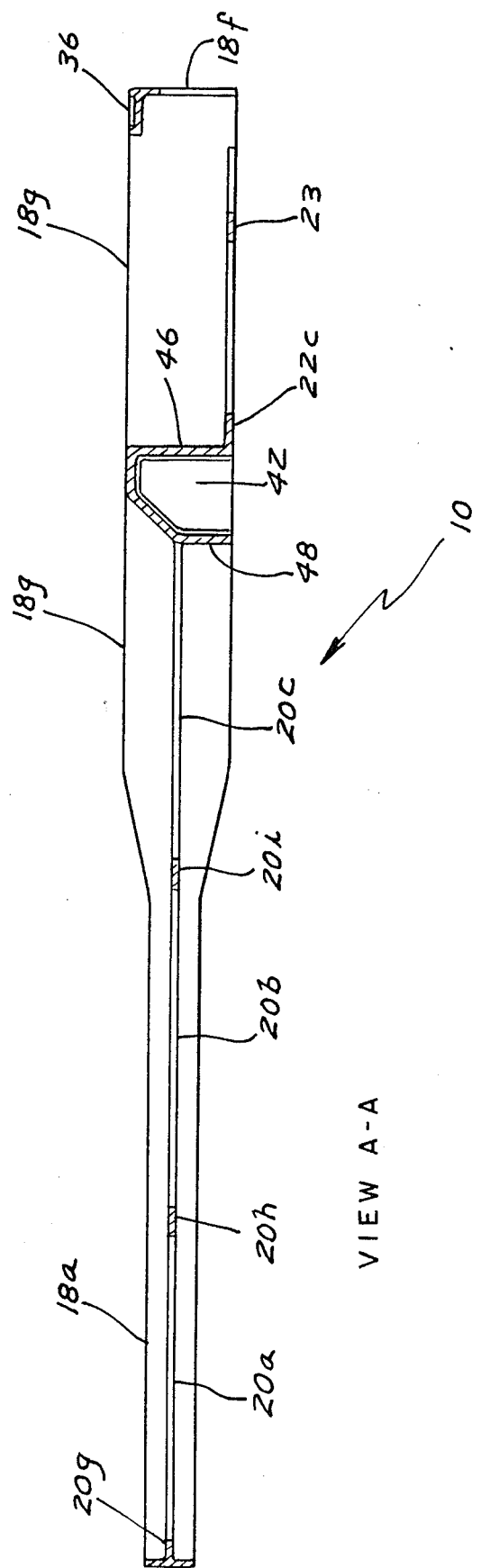
FIG. 4 illustrates a cross-sectional view of the security package taken along line 4—4 of FIG. 2.

FIG. 4 illustrates a cross section of the security package 10 taken along line 4—4 of FIG. 2 and illustrates the cross-section of the beveled box like channel member 42 and the similar beveled box like channel member 44. All numerals correspond to those elements previously described.

Figure 5:
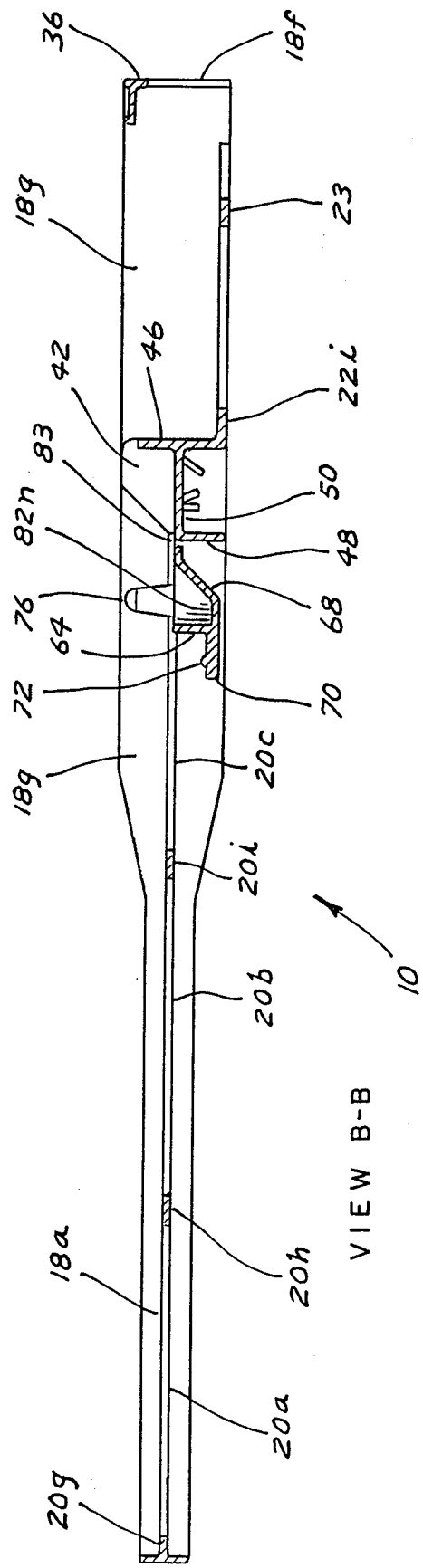
FIG. 5 illustrates a cross-sectional view of the security package taken along line 5—5 of FIG. 2.

FIG. 5 illustrates a cross section of the security package 10 taken along line 5—5 of FIG. 2 illustrating in particular the midsection of the stationary channel 24 and the rotating locking channel 16. All numerals correspond to those elements previously described.

Figure 6:
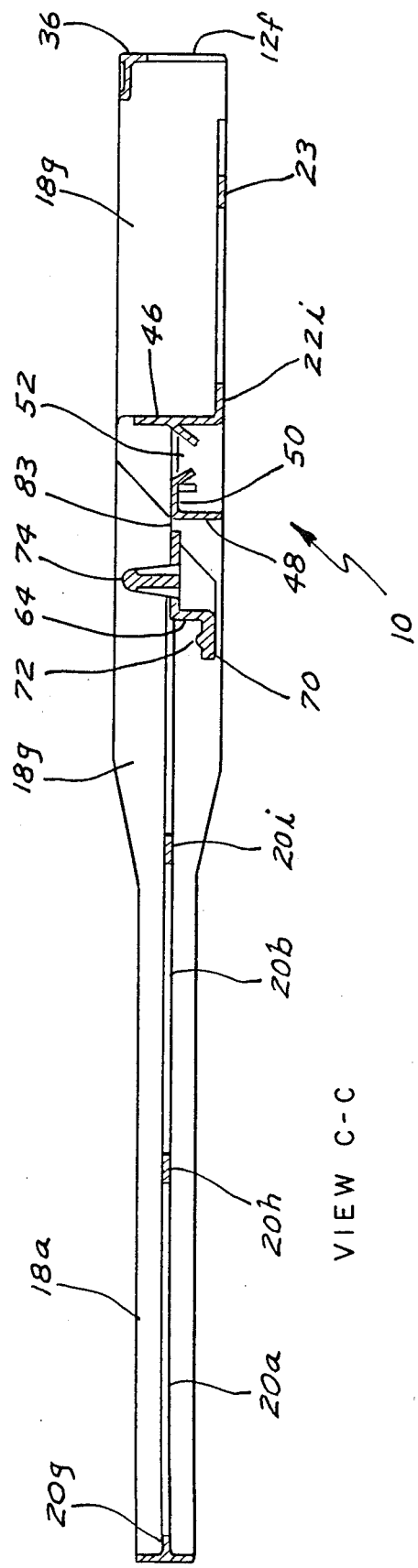
FIG. 6 illustrates a cross-sectional view taken along line 6—6 of FIG. 2.

FIG. 6 illustrates a cross section of the security package taken along line 6—6 of FIG. 2 illustrating a cross section through a latch 74 and a catch port 52. All numerals correspond to those elements previously described.

Figure 7:
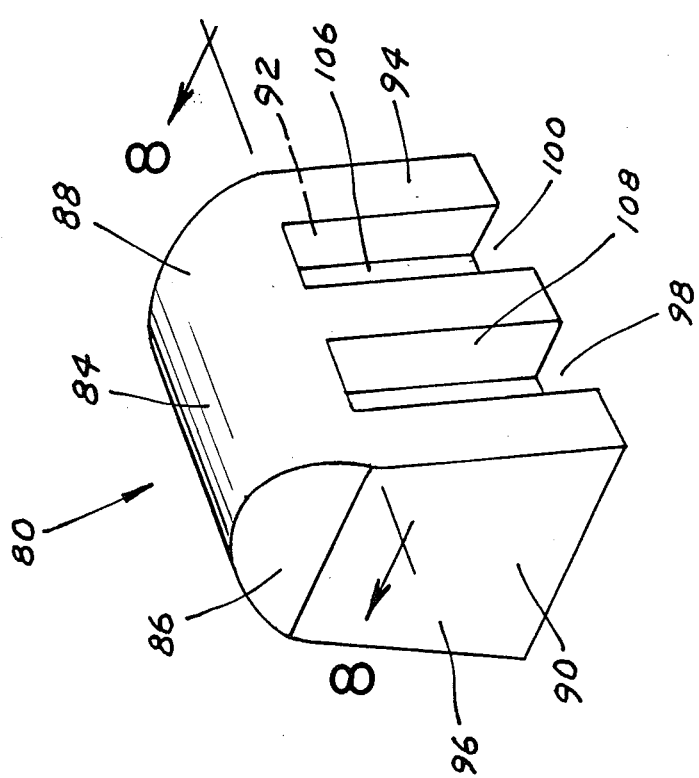
FIG. 7 illustrates a perspective view of a one-piece latch.

FIG. 7 illustrates a perspective view of a one-piece latch 80. The latch 80 includes a curved top 84, beveled ends 86 and 88 intersecting the curved top 84, end members 90 and 92, sides 94 and 96, longitudinal center member 106 between the end members 90 and 92, lateral center member 108, cavities 98 and 100 illustrated in this figure and cavities 102 and 104 as illustrated in FIG. 8.

Figure 8:
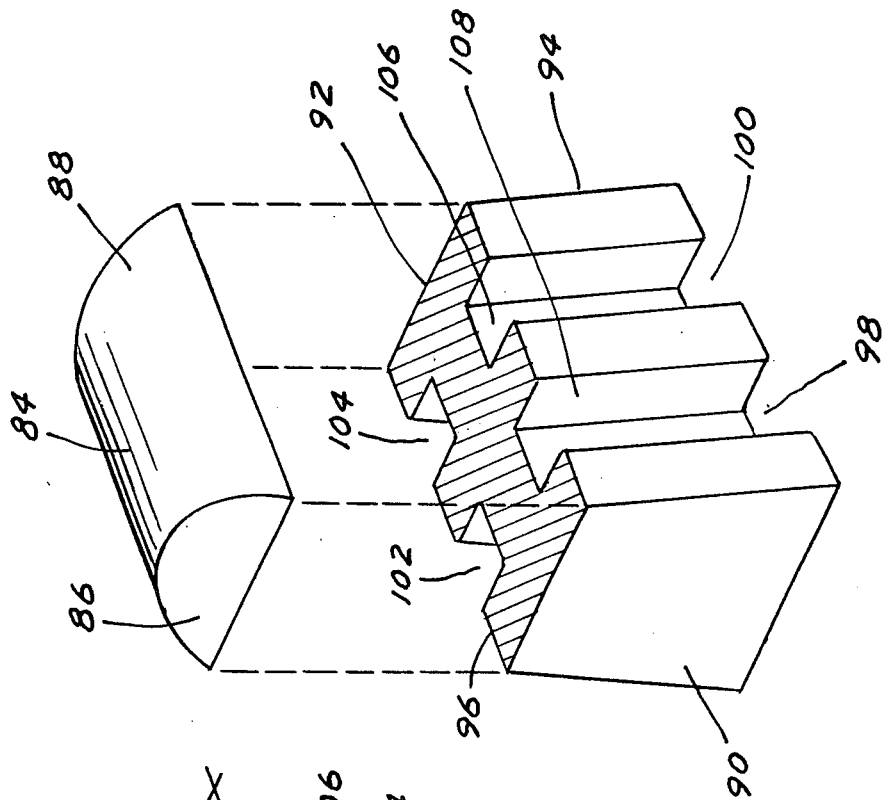
FIG. 8 is illustrates an exploded view of FIG. 7 taken along line 8—8 of FIG. 7.
Figure 9:
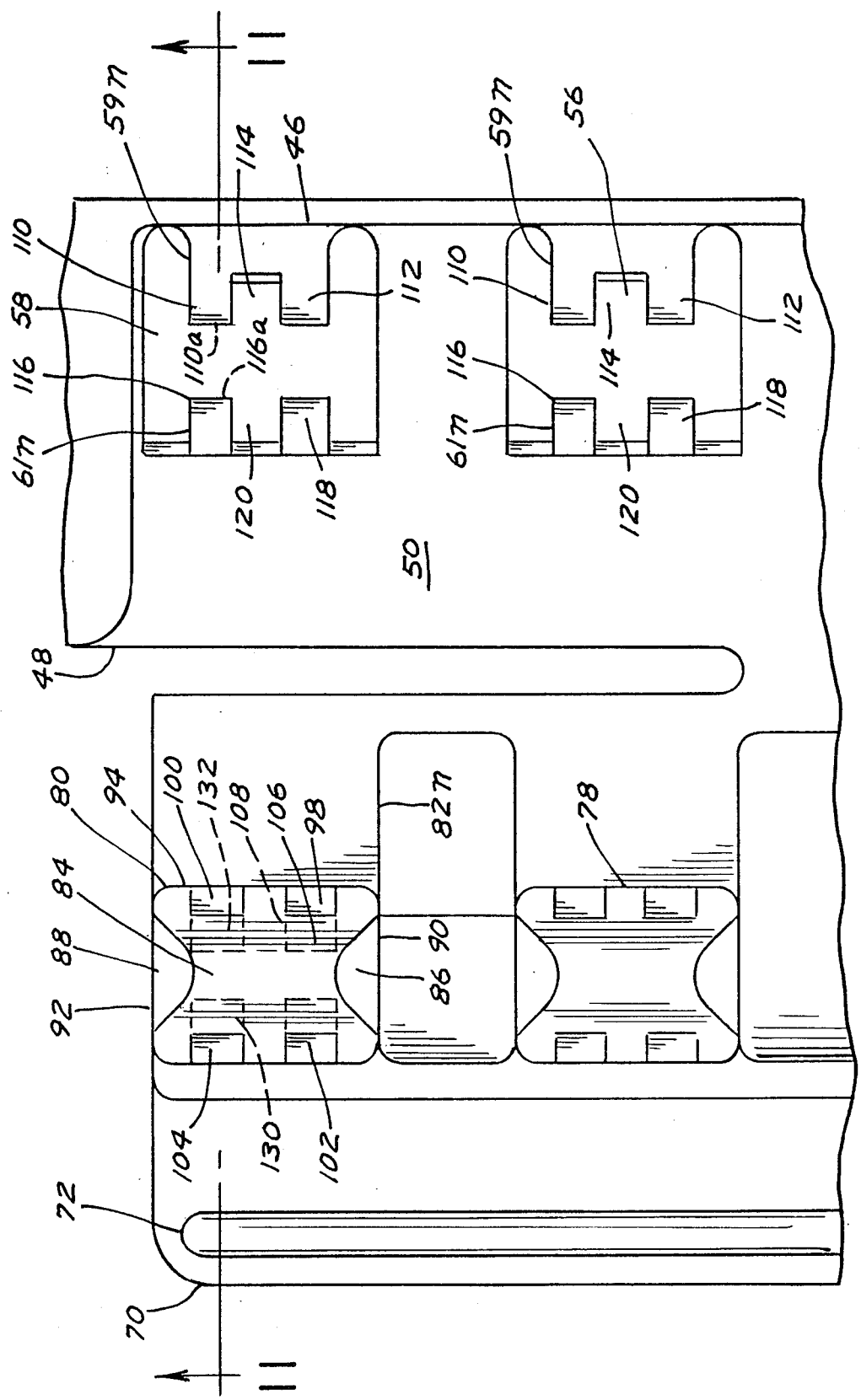
FIG. 9 illustrates a top view of the latch and catch port.

FIG. 8 illustrates an exploded section view of FIG. 7 taken along line 8—8 of FIG. 7 where all numerals correspond to those elements previously described. The longitudinal center member 106 and the lateral center member 108 assist in the formation of cavities 98-104 which snap and frictionally engage the one-way locking teeth 59n and 61n as found in the catch port 58, as illustrated in FIG. 9. The curved top 84 and beveled ends 86 and 88 assist in alignment of the typical latch 80 in the typical one-way locking teeth 59n and 61n and also in the spreading of the one-way locking teeth 59n and 61n prior to engagement into the cavities 98-104. The latch 80 is similar to latches 74-78 and it only is fully illustrated for purposes of brevity.

FIG. 9 illustrates a close up top view of the latch 80 and catch port 58 where all numerals correspond to those elements previously described. Shown in particular are the cavities 98-104 in the latch 80. One-way locking teeth 59n includes individual downwardly inclined teeth members 110 and 112 separated by a notch 114. Another opposing one-way locking teeth 61n includes individual downwardly inclined teeth members 116 and 118 separated by a notch 120. Catch ports 52-56 include similar sets of teeth, but are not fully illustrated in detail for purposes of brevity and clarity.

Figure 10:
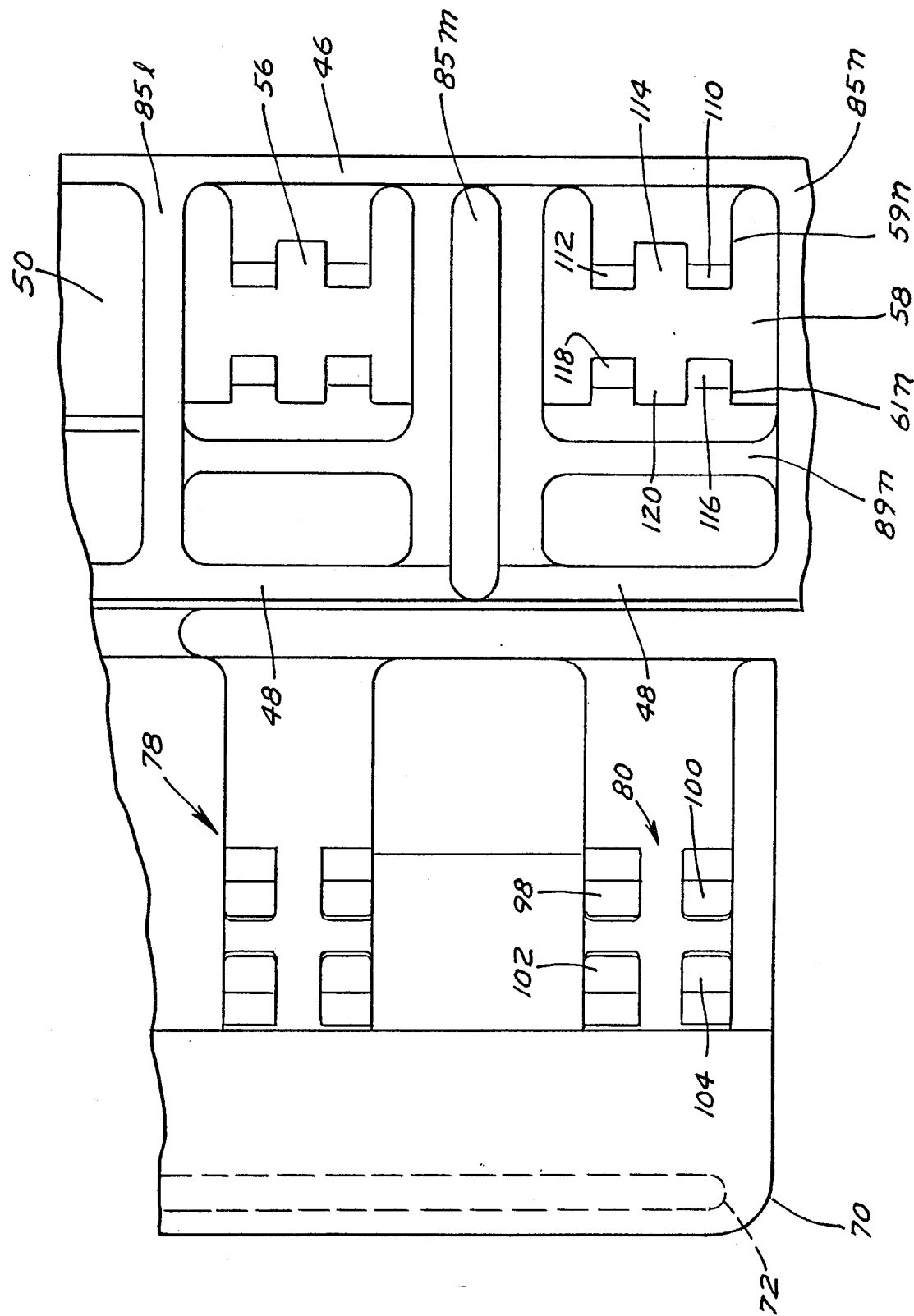
FIG. 10 illustrates an enlarged bottom view of the latching assembly.

FIG. 10 illustrates a close up enlarged bottom view of the latch 80 and catch port 58 of FIG. 9.

Figure 11:
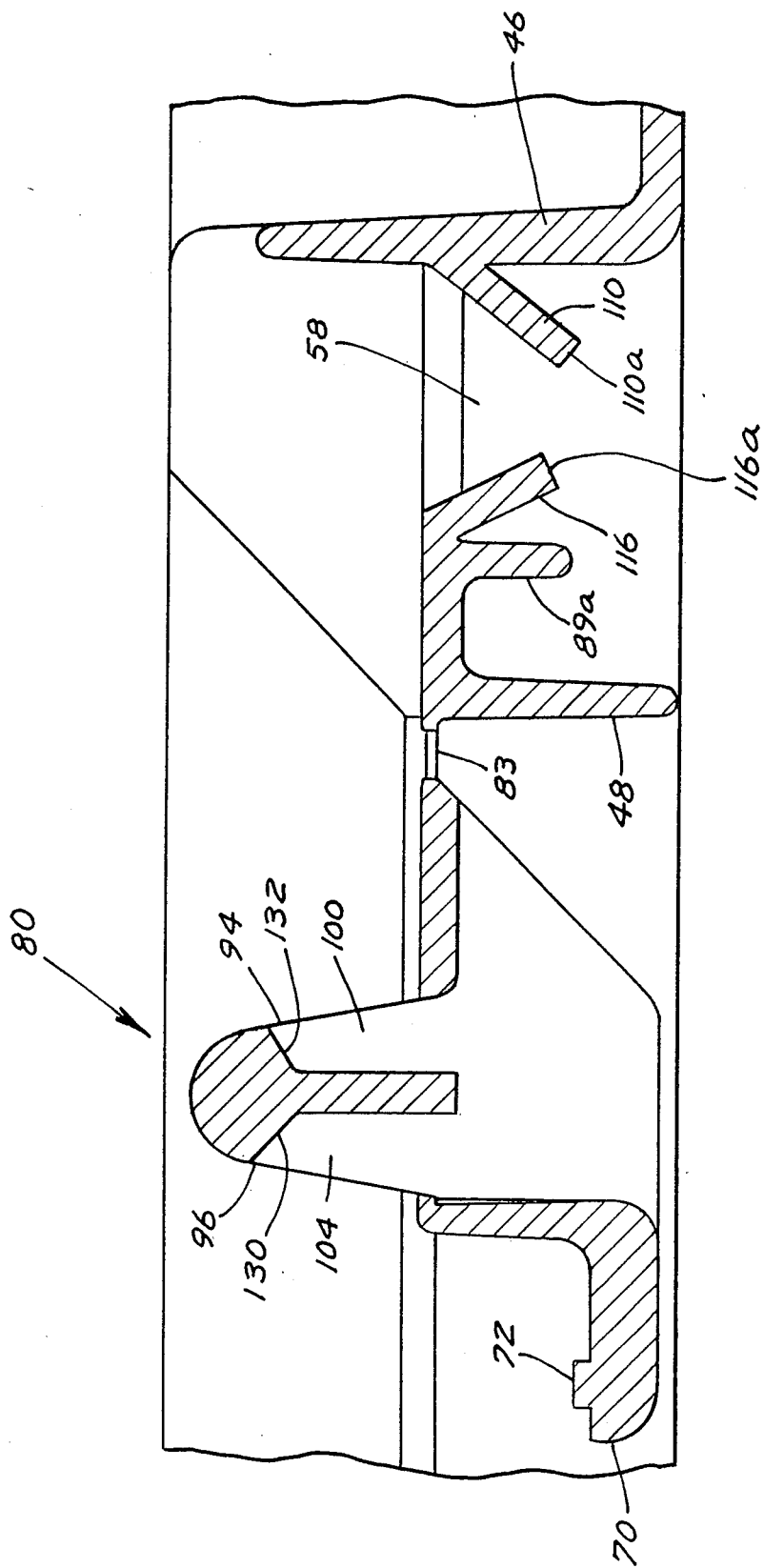
FIG. 11 illustrates a view taken along line 11—11 of FIG. 9.

FIG. 11 illustrates a cross-sectional view of the latch 80 and the catch port 58 taken along line 11—11 of FIG. 9. It is particularly noted that the beveled surfaces 130 and 132 are canted with respect to the vertical axis of the illustrated latch 80. The particular angle of canting of each of the beveled surfaces 130 and 132 such as found in cavities 102-108 and each of the latches 74-80, is such that when the beveled surfaces 130 and 132 will be parallel with end surfaces 110a of the tooth 110 and end surface 116a of the tooth 116, the latch 80 is rotated to engage teeth 116 and 110 of the catch port 58 as illustrated in FIG. 12.

MODE OF OPERATION

Figure 12:
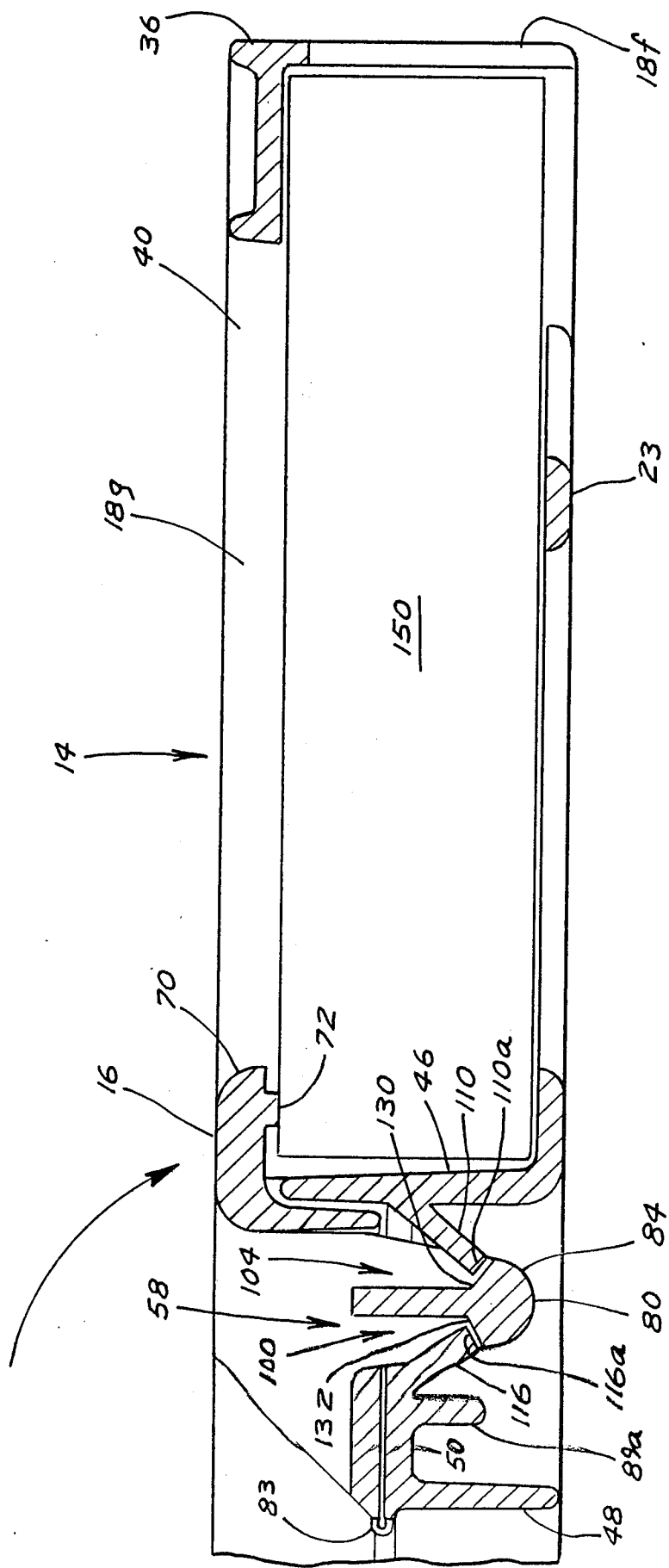
FIG. 12 illustrates the mode of operation of the locking assembly.

FIG. 12 best illustrates the mode of operation where an audio cassette 150 is placed through orifice 40 and secured in the rectangular encompassing structure 14 by rotating the rotating locking channel 16 about the living hinge 83 to engage upper surface of the audio cassette 150. The rotating locking channel 16 is held secure in place by snapping engagement of the latches 74-80 with the catch ports 52-58. The operation of one latch 80 with a catch port 58 is described and illustrated herein, and engagement of latches 74-76 with catch ports 52-56 is similar. Latch 80 is illustrated engaging catch port 58. During engagement, the curved top 84 of the latch 80 presses against teeth pair 116 and 110, and teeth pair 112 and 118, forcing the teeth pairs apart until beveled surfaces 130 and 132 proceed past teeth surfaces 116a and 110a, thus allowing the teeth members 116 and 110 to spring back to their original shape and allowing tooth surface 116a to mate in a parallel fashion against beveled surface 132 of the latch 80 and to allow tooth surface 110a to mate in a parallel fashion against beveled surface 130 of the latch 80 in a like and similar manner. Simultaneously, teeth 116 and 110 engage cavities 100 and 104, respectively, and in a like and similar fashion teeth 118 and 112, each having like surfaces, engage cavities 98 and 102, respectively. Once engaged, latch 80 is secured in the catch port 58 and retraction of the latch is virtually impossible because of the engagement of four teeth in each catch port within the four cavities in each latch. Of course, more latch catch engagements, such as with a plurality of latches 74-80 engaged with a plurality of catch ports 52-58, provides for even more security for the positive lock security package 10.

Various modifications can be made to the present invention without departing from the apparent scope thereof. While the package is injection molded of polyethylene, any suitable polymer can be utilized.

We claim:
1. A security packaging comprising:
   a. an elongated handle defining a plurality of openings, and integral therewith a rectangular encompassing structure having sides defining a width dimension, a top, a bottom, and a retaining bar extending between two sides across the bottom of said structure and defining an orifice for accepting a box;
   b. said encompassing structure having a planar surface across the top of said orifice and including at least one catch port means in said planar surface;
   c. living hinge secured to the top of said planar surface; and,
   d. planar member secured to said living hinge and including at least one latch means aligned with said catch port means whereby rotation of said planar member about said living hinges latches said latch means into said catch port means and thereby engages an article in said orifice.

2. The package of claim 1 comprising two latch means and two catch port means.

3. The package of claim 1 comprising four latch means and four catch port means.

4. The package of claim wherein said latch means includes a latch and said catch port means includes opposing angled teeth.

5. The package of claim 4 wherein said latch includes opposing beveled surfaces for mating with a top surface of said angled teeth.

6. The package of claim including a rim on said planar member which engages against an article in said orifice.

7. The package of claim 1 wherein said orifice encompasses an audio cassette box.

8. The package of claim 1 wherein said orifice encompasses a video cassette box.

9. The package of claim 1 wherein said orifice encompasses a compact disc package.

10. The package of claim 1 wherein said structure is injection molded.

11. The package of claim 1 wherein said structure is injection molded of polyethylene.

12. A security packaging comprising:
a. an elongated handle defining a plurality of openings, and integral therewith a rectangular encompassing structure having sides defining a width dimension, a top, a bottom, and a retaining bar extending between two sides across the bottom of said structure and defining an orifice for accepting a box;
b. said encompassing structure having a planar surface across the top of said orifice and including two catch port means in said planar surface, each of said catch port means including opposing angled teeth;
c. living hinge secured to the top of said planar surface; and,
d. planar member secured to said living hinge and including at least two latch means, each of said latch means comprising opposing beveled surfaces, aligned with said catch port means whereby rotation of said planar member about said living hinges latches said latch means into said catch port means and thereby engages an article in said orifice.

13. A security packaging comprising:
a. an elongated handle defining a plurality of openings, and integral therewith a rectangular encompassing structure having sides defining a width dimension, a top, a bottom, and a retaining bar extending between two sides across the bottom of said structure and defining an orifice for accepting a box;
b. said encompassing structure having a planar surface across the top of said orifice and including four catch port means in said planar surface, each of said catch port means including opposing angled teeth;
c. living hinge secured to the top of said planar surface; and,
d. planar member secured to said living hinge and including at least four latch means, each of said latch means comprising opposing beveled surfaces, aligned with said catch port means whereby rotation of said planar member about said living hinges latches said latch means into said catch port means and thereby engages an article in said orifice.

* * * * *